US 8,918,770 B2

(12) United States Patent
Ravi et al.

(10) Patent No.: US 8,918,770 B2
(45) Date of Patent: Dec. 23, 2014

(54) COMPILER FOR X86-BASED MANY-CORE COPROCESSORS (75) Inventors: Nishkam Ravi, Lawrenceville, NJ (US); Tao Bao, West Lafayette, IN (US); Ozcan Ozturk, Ankara (TR); Srimat Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 188 days.

(21) Appl. No.: 13/594,464

(22) Filed: Aug. 24, 2012

(65) Prior Publication Data

US 2013/0055225 A1 Feb. 28, 2013

Related U.S. Application Data (60) Provisional application No. 61/527,147, filed on Aug. 25, 2011, provisional application No. 61/605,370, filed on Mar. 1, 2012.

(51) Int. Cl.
*G06F 9/45* (2006.01)
*G06F 9/52* (2006.01)

(52) U.S. Cl.
CPC .............. *G06F 8/4441* (2013.01); *G06F 8/451* (2013.01); *G06F 8/456* (2013.01); *G06F 9/52* (2013.01); *G06F 8/443* (2013.01)
USPC ........... 717/149; 717/151; 717/140; 717/160; 717/161; 718/106

(58) Field of Classification Search
CPC .......... G06F 8/443; G06F 8/45; G06F 8/427; G06F 8/456
See application file for complete search history.

(56) References Cited

U.S. PATENT DOCUMENTS

| 2001/0003187 | A1* | 6/2001 | Aoki et al. ................... 709/102 |
| 2003/0188299 | A1* | 10/2003 | Broughton et al. .......... 717/141 |
| 2004/0216095 | A1* | 10/2004 | Wu ............................... 717/151 |
| 2006/0010432 | A1* | 1/2006 | Iwashita ...................... 717/136 |
| 2006/0123401 | A1* | 6/2006 | O'Brien et al. .............. 717/131 |
| 2007/0079303 | A1* | 4/2007 | Du et al. ....................... 717/151 |
| 2008/0163183 | A1* | 7/2008 | Li et al. ........................ 717/149 |
| 2008/0215768 | A1* | 9/2008 | Reid et al. ...................... 710/22 |
| 2009/0055630 | A1* | 2/2009 | Isshiki et al. ................. 712/216 |
| 2009/0125893 | A1* | 5/2009 | Copeland et al. ............ 717/151 |

(Continued)

OTHER PUBLICATIONS

Intel Developer Products Division, The Heterogeneous Offload Model for Intel Many Integrated Core Architecture, Aug. 4, 2011, pp. 1-36.*

(Continued)

*Primary Examiner* — Lewis A Bullock, Jr.
*Assistant Examiner* — Tina Huynh
(74) *Attorney, Agent, or Firm* — Joseph Kolodka (57) ABSTRACT

A system and method for compiling includes, for a parallelizable code portion of an application stored on a computer readable storage medium, determining one or more variables that are to be transferred to and/or from a coprocessor if the parallelizable code portion were to be offloaded. A start location and an end location are determined for at least one of the one or more variables as a size in memory. The parallelizable code portion is transformed by inserting an offload construct around the parallelizable code portion and passing the one or more variables and the size as arguments of the offload construct such that the parallelizable code portion is offloaded to a coprocessor at runtime.

15 Claims, 5 Drawing Sheets

(56) References Cited

U.S. PATENT DOCUMENTS

| | | | |
|---|---|---|---|
| 2010/0031241 A1* | 2/2010 | Schwartz | 717/149 |
| 2010/0037035 A1* | 2/2010 | Archer et al. | 712/28 |
| 2010/0153934 A1* | 6/2010 | Lachner | 717/146 |
| 2010/0175056 A1* | 7/2010 | Ogawa et al. | 717/151 |
| 2010/0199257 A1* | 8/2010 | Biggerstaff | 717/104 |
| 2011/0093837 A1* | 4/2011 | Guenthner et al. | 717/149 |
| 2011/0231830 A1* | 9/2011 | Udayakumaran et al. | 717/160 |

OTHER PUBLICATIONS

Lee, S., et al. "OpenMP to GPGPU: A Compiler Framework for Automatic Translation and Optimization" Proceedings of the 14th ACM SIGPLAN symposium on Principles and practice of parallel programming. Feb. 2009. (10 Pages).

Baskaran, M., et al. "Automatic C-To-CUDA Code Generation for Affine Programs" Proceedings of the 19th joint European conference on Theory and Practice of Software, international conference on Compiler Construction. Mar. 2010. pp. 244-263.

* cited by examiner

For a parent loop, determining whether all nested loops are parallelizable.
402

↓

Hoisting the offload construct outside the parent loop.
404

Determining whether a variable is used only within the transformed parallelizable code portion.
502

↓

Moving a declaration of the variable within the offload construct.
504

Transforming a memory allocation such that the address is 64-byte aligned.
602

↓

Rounding the size of the allocated pointer to the next multiple of 64.
604

```
For two separate code portions, combining the code portions
by applying if-fusion.
702
```
↓
```
For a variable to copied in for a first offload construct and a
second offload construct, transforming code such that the
variable is copied in for the first offload construct and not
deallocated through the second offload construct.
704
```
↓
```
For a variable to be copied in and out for a first offload
construct and a second offload construct, transforming code
such that the variable is copied in for the first offload construct
and copied out for the second offload construct.
706
```
↓
```
For an offload construct within a loop, transforming code such
that a variable is copied in only during the first iteration
708
```

FIG. 7

007# COMPILER FOR X86-BASED MANY-CORE COPROCESSORS

RELATED APPLICATION INFORMATION

This application claims priority to provisional application Ser. No. 61/527,147 filed on Aug. 25, 2011 and provisional application Ser. No. 61/605,370 filed on Mar. 1, 2012, both of which are incorporated herein by reference.

BACKGROUND

1. Technical Field

The present invention relates to a compiler, and more specifically to an optimizing compiler for many-core coprocessors.

2. Description of the Related Art

Many core processors, such as the Intel™ Many Integrated Core (MIC), are aimed at accelerating multi-core high performance computing (HPC) applications. Legacy applications can be compiled and executed on MIC by selectively inserting Language Extensions for Offload (LEO) keywords in the application code identifying parallel code portions to be offloaded to the MIC coprocessor. The goal is to improve overall application performance by taking advantage of the large number of cores on MIC (for multithreading) and the wide single instruction, multiple data (SIMD) units (for vectorization). However, porting legacy applications to the MIC architecture may involve manually identifying highly parallel code portions and corresponding data transfers, which may require significant developer effort and experimentation to maximize performance.

SUMMARY

A method for compiling includes, for a parallelizable code portion of an application stored on a computer readable storage medium, determining one or more variables that are to be transferred to and/or from a coprocessor if the parallelizable code portion were to be offloaded. A start location and an end location are determined for at least one of the one or more variables as a size in memory. The parallelizable code portion is transformed by inserting an offload construct around the parallelizable code portion and passing the one or more variables and the size as arguments of the offload construct such that the parallelizable code portion is offloaded to a coprocessor at runtime.

A method for compiling includes, for a parallelizable code portion of an application stored on a computer readable storage medium, determining one or more variables that are to be transferred to and/or from a coprocessor if the parallelizable code portion were to be offloaded. A start location and an end location for at least one of the one or more variables are determined as a size in memory. The parallelizable code portion is transformed by inserting an offload construct around the parallelizable code portion and passing the one or more variables and the size as arguments of the offload construct. The parallelizable code portion is offloaded to a coprocessor at runtime based upon a cost-benefit analysis such that an original parallelizable code portion is applied if the cost-benefit analysis fails.

A system for compiling includes a data analysis module configured to determine one or more variables that are to be transferred to and/or from a coprocessor for a parallelizable code portion of an application stored on a computer readable storage medium, if the parallelizable code portion were to be offloaded. The data analysis module is further configured to determine a start location and an end location for at least one of the one or more variables as a size in memory. A transformation module is configured to transform the parallelizable code portion by inserting an offload construct around the parallelizable code portion and passing the one or more variables and the size as arguments of the offload construct such that the parallelizable code portion is offloaded to a coprocessor at runtime.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a compiler for x86-based many-core coprocessors is provided to port legacy applications to benefit from many-core architecture. Preferably, the compiler receives an annotated application identifying parallelizable code portions. For each parallelizable code portion, the compiler first performs a liveness analysis to determine variables that are to be copied in to (live-in variables) and out of (live-out variables) the many-core coprocessor. An array bound analysis is also performed to determine the start and end location of each array/pointer used in the code portion as a size in memory.

The compiler then transforms the parallelizable code portions by inserting an offload construct before the parallelizable code portions. In/out/inout clauses are passed as arguments of the offload construct and are populated based on the results of the liveness analysis and array bound analysis. In a preferred embodiment, the parallelizable code portion is guarded by an if condition that invokes a cost-benefit analysis function (at runtime) to determine whether offloading the particular code section to the many-core coprocessor would be beneficial. The cost-benefit analysis is preferably based on one or more of the following parameters: CPU operations per loop, weighted for different operations; memory operations per loop; loop iterations for each loop; and data transfer size. One or more of the parameters may be applied in a number of heuristic checks against (e.g., experimentally obtained) thresholds in the cost-benefit analysis. The original, unmodified code portion is placed in the else branch to be executed if the cost-benefit analysis determines that offloading the parallelizable code portion to the many-core coprocessor would not be beneficial.

In another embodiment, the compiler may include a performance optimizer. Optimization may include offload hoisting to hoist the offload construct out of a parent loop. Data declaration optimization may be performed to move data declarations to within the parallelizable code portions. Malloc-to-memalign conversion may be performed to allow direct memory access transfers. Data reuse optimization may also be performed to eliminate redundant data transfers. Other optimizations are also contemplated.

Advantageously, the present principles minimize developer effort for porting a legacy application to many-core architectures and maximize the performance of the application on many-core architecture with minimal user involvement.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Many-core coprocessors, such as Intel™ Many Integrated Core Architecture (MIC), are intended for use primarily as a coprocessor/accelerator, in a similar way as graphics processing units (GPUs) are used for general purpose computing in conjunction with central processing units (CPUs). MIC is designed to leverage the x86 experience and benefit from existing parallelization tools and programming models, such as, e.g., OpenMP, OpenCL, Intel Cilk Plus, etc.

In order to take advantage of the MIC coprocessor, a developer may manually identify portions of code in the applications that can benefit from the MIC architecture. One example would be a highly parallel hot loop. The developer can annotate such regions of code using an offload construct, #pragma offload. These regions of code will be referred to as parallelizable code portions or offloadable code portions. Pseudocode 1 illustratively depicts a pragma offload example.

---

Pseudocode 1: pragma offload example.

```
#pragma offload target(mic) in(B,C:length(n))
out(A:length(n))
{
    #pragma omp parallel for shared(A,B,C) private(i)
    for (i=0; i<n; i++){
        A[i] = B[i] * C[i];
    }
}
```

---

Corresponding data/variables to be copied and direction of copy can be specified using in/out/inout clauses. The size of the data/variable to be copied can be specified using the length clause. When such a parallelizable code portion is encountered, execution on the host processor is suspended, continued on the MIC coprocessor, and then resumed on the host processor once the parallelizable code portion on MIC has executed to completion. The transfer of code and data maybe be performed over Peripheral Component Interconnect Express (PCIe) and managed by runtime libraries supplied with the MIC software stack. The Intel™ Compiler auto-generates invocations to the libraries for code and data transfer for annotated code portions. All the annotated code portions are transferred to MIC over PCIe in one shot at runtime when the first #pragma offload is encountered. However, data transfers for every marked code portions, as specified through the in/out/inout clauses, are managed individually as and when they are encountered.

Language Extensions for Offload (LEO), a programming model for MIC, includes a number of programming language extensions/keywords to enable code and data transfer between CPU and MIC. While the present principles may be discussed with respect to LEO, it is noted that the present principles may also be applicable to other programming models and language extensions, such as, e.g., Open ACC, C++ Amp, etc. Exemplary LEO keywords are shown in Table 1.

TABLE 1 exemplary LEO keywords.

| LEO Keyword | Description |
| --- | --- |
| #pragma offload <clauses> | Execute next code block on coprocessor |
| target(mic) | Specify MIC coprocessor as the target for offload |
| in(<var-list>:<length(size)>) | Copy from host to coprocessor |
| out(<var-list>:<length(size)>) | Copy from coprocessor to host |
| inout(<var-list>:<length(size)>) | Copy from host to coprocessor and back |
| nocopy(<var-list>:<length(size)>) | Prohibit copying from host to coprocessor |

TABLE 1-continued exemplary LEO keywords.

| LEO Keyword | Description |
| --- | --- |
| length(<size>) | Specify the size of the pointer data to be copied |
| alloc_if(<condition>) | Allocate memory on coprocessor for the given pointer only if condition is true |
| free_if(<condition>) | Free memory on coprocessor for the given pointer only if condition is true |
| __attribute__((target(mic))) | Allocate variable or function on both host and coprocessor |
| !dir$ offload <clauses> | Fortran equivalent of offload pragma |
| __Shared<variable/function> | Variable/function is visible on both host and coprocessor |
| __Offload<function> | Execute function on coprocessor |

Figure 1:
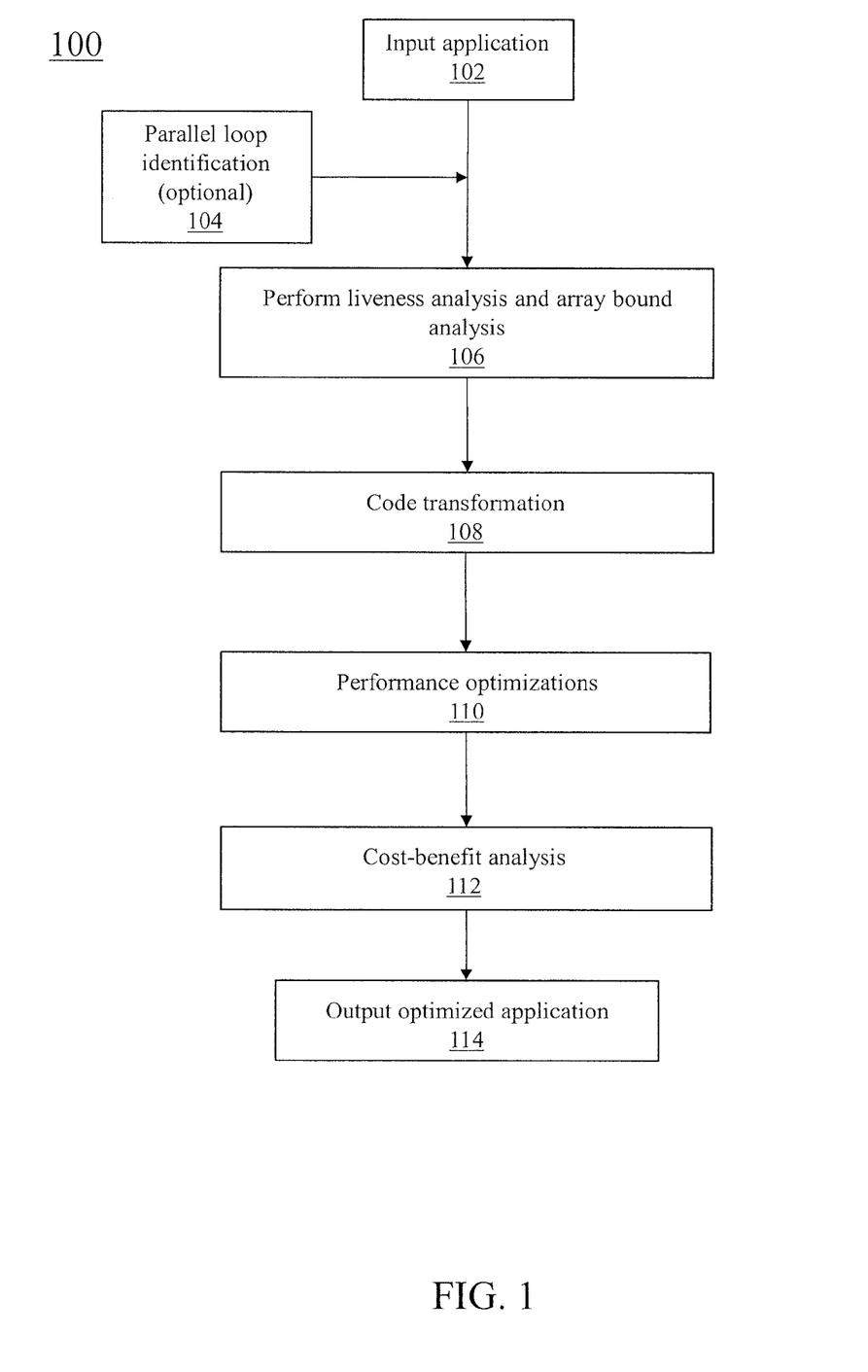
FIG. 1 is a block/flow diagram showing a system/method of a high-level overview of a compiler in accordance with one embodiment.

Referring now to the drawings in which like numerals represent the same or similar elements and initially to FIG. 1, a high-level overview of a compiler 100 is illustratively depicted in accordance with one embodiment. The compiler 100 may port a legacy application to benefit from the many-core architecture. In block 102, an application is inputted into the compiler. The application is preferably written in one or more of C, C++, and Fortran; however, it is noted that the application may also be written in other programming languages. In one particularly useful embodiment, the application is annotated to identify parallelizable code portions. Applications may be annotated using, e.g., OpenMP or CilkPlus constructs. Other programming models may also be utilized. In another embodiment, the application has already been modified for MIC.

In block 104, if the input application is a vanilla application (written in, e.g., C or C++) such that no parallelizable loops have been identified, parallelizable code portions may be identified. In one embodiment, the (e.g., Intel™) Compiler's auto-parallelizer may be invoked to identify parallelizable code portions. Identified parallelizable code portions may be annotated using #pragma omp parallel. Other methods of identifying parallelizable code portions are also contemplated.

In block 106, for each parallelizable code portion, liveness analysis is performed. Liveness analysis includes determining live-in variables and live-out variables. Live-in variables are variables that are to be copied in to MIC if the code portions were to be offloaded and live-out variables are variables that are to be copied out of MIC if the code portions were to be offloaded. The determined live-in and live-out variables are used for populating the in/out/inout clauses of the offload construct to specify data transfers. An array bound analysis is then performed to determine the start and end location of each array/pointer used in the code portions. The results of the array bound analysis are used to populate the length clause of the offload construct that specifies the number of bytes (i.e., size) to be copied starting from a particular memory location.

In block 108, the code is transformed such that the parallelizable code portions are offloaded to MIC coprocessors. An offload construct, #pragma offload, is inserted right before the parallelizable code portions, along with the in/out/inout and length clauses. The parallelizable code portions are preferably guarded by an if condition that invokes the cost-benefit analysis function (at runtime) to determine if offloading this particular code portion to the coprocessor would be beneficial. The original, unmodified code portion is placed in the else branch to be executed on the host processor where the cost-benefit analysis determines that it would not be beneficial to offload the parallelizable code portions to the coprocessor. This code transformation is referred to as conditional offload insertion. Conditional offload insertion is carried out for every parallelizable code portion to reduce the developer's efforts.

In block 110, a number of performance optimizations are applied to the code in the then branch of the if condition. The performance optimizations may include one or more of the following: Offload Hoisting—pragma offload is hoisted out of the parent loop recursively when legal and profitable; Data Declaration Optimization—certain data declarations are moved inside the parallelizable code portions to reduce data transfer overhead; Data Reuse Optimization—if two successive offload code portions share data, the data transfers are combined to eliminate redundant transfers; and Malloc-to-memalign Conversion—direct memory access (DMA) transfers are triggered whenever possible. It is noted that traditional compiler optimizations (e.g., vectorization) may also be independently performed by the Compiler.

In block 112, a cost-benefit analysis may be performed to determine if a code portion should be offloaded at runtime. The cost-benefit analysis inspects every parallelizable code portion after all the transformations have been applied, determines the amount of computation being performed and the amount of data transfer needed, and populates the parameter list for the cost-benefit analysis.

In block 114, an optimized application is outputted. The optimized application may run on multi-core processors and many-core processors (e.g., MIC) and yields better performance.

Figure 2:
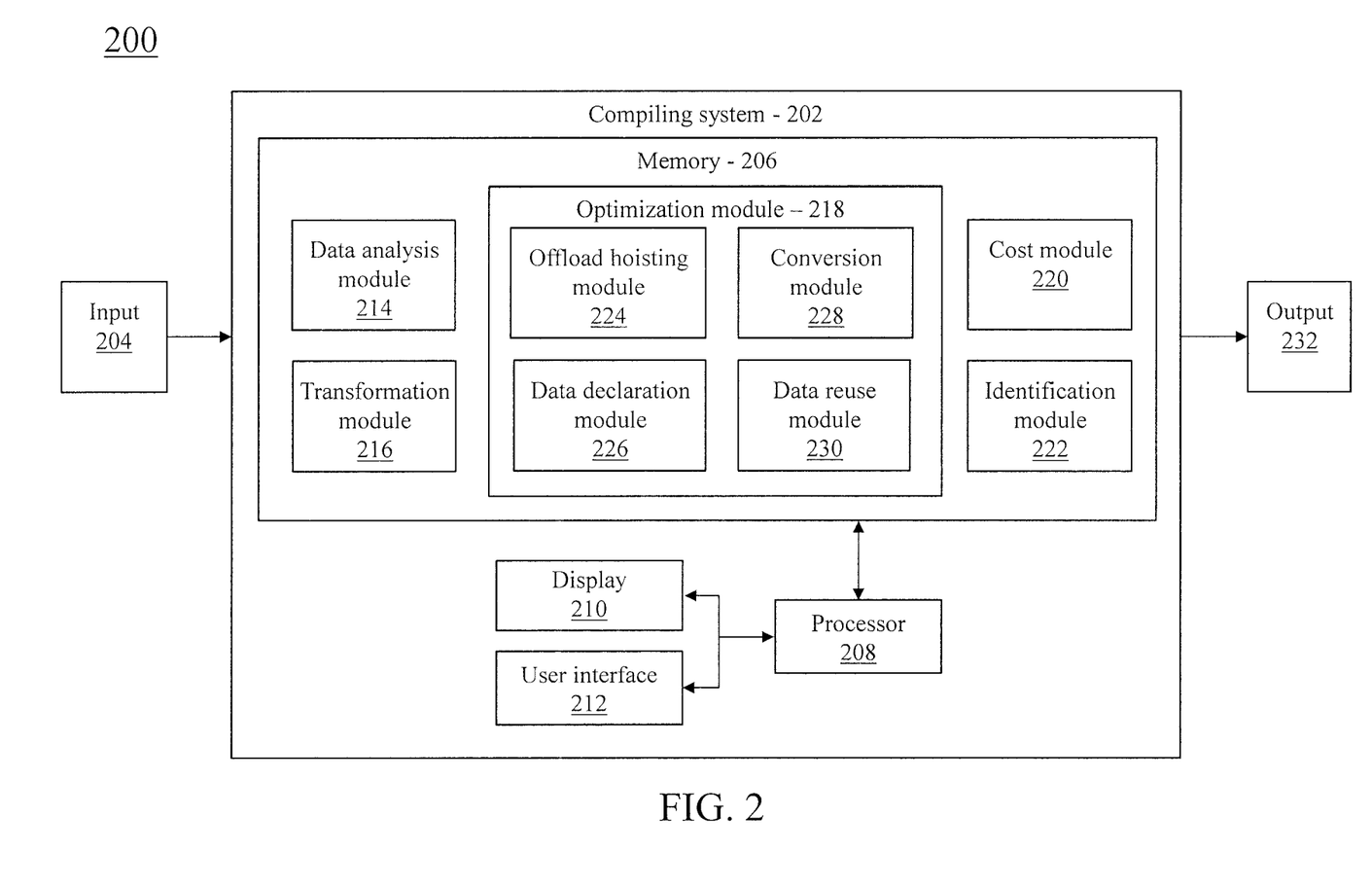
FIG. 2 is a block/flow diagram showing a system for compiling in accordance with one embodiment.

In further detail, referring now to FIG. 2, a system for compiling 200 is illustratively depicted in accordance with one embodiment. Preferably, the system 200 is implemented on top of the GNU compiler collection (GCC) as a preprocessing tool. It is noted that while the present principles may be discussed with respect to Intel™ MIC, the present principles are much broader and may be applicable to any multi-core and/or many-core architectures.

The system 200 may include a compiling system or workstation 202, preferably including one or more processors 208 and memory 206 for storing programs, applications, etc. System 202 may include one or more displays 210 for viewing. The displays 210 may also permit a user to interact with the system 202 and its components and functions. This is further facilitated by a user interface 212, which may include a keyboard, mouse, joystick, or any other peripheral or control to permit user interaction with the system 202. It should be understood that the functions and components of system 200 may be integrated into one or more workstations or systems.

The system 202 receives input 204, which may include one or more applications. In one embodiment, the applications are written in, e.g., C, C++, Fortran, however other programming languages are contemplated. In a preferred embodiment, code of the application has been annotated to identify parallelizable code portions. For example, parallelizable code portions may be annotated with OpenMP or CilkPlus constructs, however other programming models may also be utilized. In another embodiment, the application may be an unoptimized MIC application. Other types of inputs are also contemplated.

The system 202 includes memory 206, which may include data analysis module 214. The data analysis module 214 is configured to parse code of the application to identify parallelizable code portions (e.g., annotated with OpenMP, CilkPlus constructs). For every parallelizable code portion, the data analysis module 214 performs liveness analysis followed by array bound analysis. A parallelizable code portion generally refers to a parallelizable loop annotated with, e.g., OpenMP or CilkPlus constructs. A developer may trigger the data analysis module 214 by specifying a flag, such as—gen-codeMIC, during compilation. The results may be stored in a data structure called offload_regions created during parsing. To simplify analysis, compiler generated variables that are introduced in the process of lowering OpenMP pragmas may be ignored.

The data analysis module 214 is configured to perform liveness analysis to determine live-in variables that are to be copied in to MIC and live-out variables that are to be copied out of MIC, if the code portion were to be offloaded. Liveness analysis handles simple arrays and pointers, in addition to scalars. Prior to performing liveness analysis, all function invocations within the parallelizable code portions are eliminated by, e.g., inlining the function bodies. If inlining is not possible, the function invocations are marked as not-offloadable. Existing GCC modules are leveraged for live-in/live-out analysis for scalars, and are extended to handle pointers and arrays.

There is no special representation for arrays in GCC, so for the purpose of liveness analysis, arrays are handled the same way as pointers: a write to a memory location servers as a def for the pointer/array that points to that memory location. Due to the complexity of handling pointers and arrays, the best effort approach is used. Indirect memory references, nested arrays, and structs are not handled in the current implementation due to the limitations of the array bound analysis pass.

Bitmaps are used to record LIVE_IN and LIVE_OUT sets for each basic block. A bitmap is a finite-length sequence of bits (i.e., 0s and 1s) which succinctly store truth values for a fixed number of variables. A basic block is a straight line sequence of code with a single entry and exit point and no branches. At the end of the analysis, the LIVE_IN set for the first basic block of the offloadable code portion is stored as the IN set for the code portion. The LIVE_OUT set of global variables is computed a little differently. Since the interprocedural analysis is limited in its capability, the absence of the user of a global variable in the rest of the application cannot be guaranteed. To err on the conservative side, the LIVE_OUT set includes all global variables that are defined/re-defined inside the code portion. The LIVE_OUT set of the last basic block of the parallelizable code portion is stored as the OUT set for the code portion.

The variables that are common to both the IN and OUT sets are used for populating the inout clause, which signifies the set of variables that should be copied into MIC prior to the execution of the code portion and copied out of MIC after completion. Variables that are present only in the IN set are used for populating the in clause, which signifies the set of variables that should be copied into MIC. The scalars present only in the OUT set populate the out clause, which signifies the set of variables that should be copied out of MIC after the code portion executes to completion. It is noted that all of the pointers/arrays that are only present in the OUT set are added to the inout clause (instead of the out clause). This is because when an array is copied back to host memory, any unassigned memory locations (on the MIC side) will cause null/garbage to be written onto corresponding memory locations on the host side. To prevent this from happening, it is important to copy the contents of the array into MIC memory, even if there are no reads to it. Pseudocode 2 illustratively depicts pseudo code for liveness analysis.

Pseudocode 2: liveness analysis example.

```
void f( ){
    ...
    // candidate code portion
    #pragma omp parallel for ..
    for(i=0; i < 100; i++){
        int x = a;
        A[i] = B[i];
        C[i] = D[i];
        D[i] = x*i;
    }
    ...
    E[k] = A[k]*x;
    F[k] = D[k]*k;
    ...
}
LIVE IN = {a, B, D}, LIVE OUT = {x, A, D}
IN = {a, B}, OUT = {x, A}, INOUT = {D}
State of pragma offload after liveness analysis (length clauses are
populated afterwards); note that array A is added to the inout clause:
#pragma offload target(MIC) in(a) in(B:length(..))
out(x) inout(A:length(..),D:length(..))
```

The data analysis module 214 is also configured to perform an array bound analysis to determine the start and end location of each array/pointer used in the parallelizable code portion. For any non-scalar variable (i.e., arrays and pointers), the size of the memory to be copied is specified using the length clause. The length of a scalar variable is always 1. Estimating the section of memory that would be used within a code portion for a given pointer is non-trivial. In one embodiment, the declaration of the array/pointer is traced and the entire size of the array/pointer (when available) is passed to the length clause. However, this may result in redundant data transfers. In a preferred embodiment, the memory allocation pattern of a pointer is identified by parsing it as a function of the loop indices (using scalar evolution representation). For each loop index, the corresponding stride, lower bound and upper bound are extracted to estimate the bounds of the pointer/array. Pseudocode 3 shows exemplary code for array bound analysis.

Pseudocode 3: array bound analysis example.

```
for(i=30; i < 100; i++){
    x = A[i];
}
Simplified IR:
a = 30;
loop_1
    b = phi(a,c)
    x = A[b];
    c = b + 1;
    if(c > 100) exit_loop
endloop
Scalar Evolution Rep. for b: {30,+,1}
```

-continued

Pseudocode 3: array bound analysis example.

```
=⇒ initial value=30, increment=+1
Upper Bound of loop: 100
Bounds of array A: {30,100}
```

Where the liveness or size of a given pointer is not able to be estimated for an offloadable code portion, a comment next to the pragma offload clause may be printed as an indication to the developer to manually address the portion.

Memory 206 may also include transformation module 216 configured to transform code such that the parallelizable code portions are offloaded to MIC coprocessors. Where the flag—gencodeMIC is used, the input is assumed to be an OpenMP or CilkPlus application. Conditional offload insertion is carried out for every offload code portion parsed by the data analysis module 214. Where the flag—optimizeMIC is used instead, the input is assumed to be a MIC application. In this case, the #pragma conditional-offload statements are lowered.

Conditional offload insertion includes three steps. In a first step, an if-then-else block is created, where the original parallelizable code portion is placed in the else branch and a copy of the code portion is placed in the then branch. An invocation of the cost-benefit analysis function (cbf( )) of the cost module 218 is introduced as the predicate to the if condition. The parameter list for cbf( ) is empty at this point. In a second step, an offload construct, #pragma offload, is inserted at the beginning of the then branch along with empty in/out/inout and length clauses, such that the parallelizable code portion is offloaded when the cost-benefit analysis determines it would be beneficial to offload the code to a coprocessor. In a third step, the results of the liveness analysis and the array bound analysis (stored in offload_regions), performed by the data analysis module 214, is used to populate the in/out/inout and length clauses. Pseudocode 4 shows example code for conditional offload insertion.

Pseudocode 4: conditional offload insertion example.

```
Original code:
#pragma omp parallel for shared(A,B,C) private(i)
for (i=0; i<n; i++){
    A[i] = B[i] * C[i];
}
Transformed code:
if(cbf( )){
    #pragma offload target(mic) in(B,C:length(n))
    out(A:length(n))
    {
        #pragma omp parallel for shared(A,B,C) private(i)
        for (i=0; i<n; i++){
            A[i] = B[i] * C[i];
        }
    }
}else{
    #pragma omp parallel for shared(A,B,C) private(i)
    for (i=0; i<n; i++){
        A[i] = B[i] * C[i];
    }
}
```

In one embodiment, instead of applying conditional offload insertion for every offload candidate, offload candidates can be pruned down by inspecting the profile information of the application. Offload candidates that take up less than t % (e.g., t<10) of the total time of execution of the application may be ignored. This may be incorporated as part of the conditional offload insertion.

Where the input application is already a MIC application, lowering #pragma conditional-offload may be performed. Lowering #pragma conditional-offload is similar to conditional offload insertion. An if-then-else block is created, where the original code portion is placed in the else branch and a copy of the code portion is placed in the then branch. An invocation to the cost-benefit analysis function (cbf( )) is introduced as the predicate of the if condition. The #pragma conditional-offload is replaced by #pragma offload in the then branch, and deleted from the else branch. An entry is made into offload_regions for this code portion. Pseudocode 5 shows example code for lowering #pragma conditional-offload.

Pseudocode 5: lowering #pragma conditional-offload example.

```
Original code:
#pragma conditional-offload target(mic) in(B,C:length(n))
out(A:length(n))
{
    #pragma omp parallel for shared(A,B,C) private(i)
    for (i=0; i<n; i++){
        A[i] = B[i] * C[i];
    }
}
Transformed code:
if(cbf( )){
    #pragma offload target(mic) in(B,C:length(n))
    out(A:length(n))
    {
        #pragma omp parallel for shared(A,B,C) private(i)
        for (i=0; i<n; i++){
            A[i] = B[i] * C[i];
        }
    }
}else{
    #pragma omp parallel for shared(A,B,C) private(i)
    for (i=0; i<n; i++){
        A[i] = B[i] * C[i];
    }
}
```

Memory 206 also includes optimization module 218 configured to optimize the transformed code from the transformation module 216. Two copies of every offload candidate loop are created during conditional offload insertion performed by transformation module 216, as illustrated in Pseudocode 4. The first copy corresponds to the loop that would be offloaded to MIC if the conditional if block returns true. To maximize performance and minimize data transfer overhead between the host processor and MIC, a number of performance optimizations are performed as source-to-source transformations on the first copy of the loop. The optimization module 218 includes, e.g., offload hoisting module 224 configured to perform offload hoisting, data declaration module 226 configured to perform data declaration optimization, conversion module 228 configured to perform malloc-to-memalign conversions, and data reuse module 230 configured to perform data reuse optimization. Traditional compiler optimizations (e.g., vectorization) may also be performed by the compiler independently. Other optimizations are also contemplated.

Optimization module 218 includes offload hoisting module 224 configured to perform offload hoisting. Optimal placement of pragma offload is essential for performance. Consider the original code in Pseudocode 6 below. The offload overhead for the pragma offload is 100*(t1+t2), where t1 and t2 represent the time it takes to complete offload/data transfer for the two code portions respectively. The offload hoisting module 224 is configured to hoist the offload construct, #pragma offload, out of the parent loop, as illustrated in the transformed code of Pseudocode 6, to reduce the data transfer time to t1+t2, significantly improving performance.

Generally, offload hoisting aims to exploit opportunities for work consolidation by constructing one large code portion for offload from several small ones, in order to minimize the communication overhead between the host processor and MIC. This is implemented as iterative hoisting (and combining) of pragma offloads. In order to hoist pragma offload, all sibling hot inner loops should be parallelizable and the serial code between them should be minimal. The in/out/inout clause for the hoisted pragma offload is constructed by combining the in/out/inout clauses of the inner loop pragmas.

Pseudocode 6: offload pragma hoisting example.

```
Original Code:
for(j=0; j<100; j++){
    #pragma offload target(mic) in(B,C:length(n))
    out(A:length(n))
    {
        #pragma omp parallel for shared(A,B,C) private(i)
        for (i=0; i<n; i++){
            A[i] = B[i] * C[i];
        }
    }
    ...
    #pragma offload target(mic) in(A,B:length(n))
    out(D:length(n))
    {
        #pragma omp parallel for shared(A,B,D) private(i)
        for (i=0; i<n; i++){
            D[i] = A[i] + B[i];
        }
    }
    ...
}
Transformed Code:
#pragma offload target(mic) in(A,B,C:length(n))
out(A,D:length(n))
{
    for(j=0; j<100; j++){
        #pragma omp parallel for shared(A,B,C) private(i)
        for (i=0; i<n; i++){
            A[i] = B[i] * C[i];
        }
        ...
        #pragma omp parallel for shared(A,B,D) private(i)
        for (i=0; i<n; i++){
            D[i] = A[i] + B[i];
        }
    }
}
```

Optimization module 218 also includes data declaration module 226 configured to perform data declaration optimization for reducing communication overhead. For all of the variables in the LIVE_IN set of a parallelizable code portion that are declared outside, it is determined whether the variable is used only inside the code portion. This may be performed by looking at the use-def chain to verify that the declaration is local to the function and that there are no uses/definitions of the variable outside the code portion, except for the declaration itself. The declaration of such variables is preferably moved inside the parallelizable code portion to avoid the redundant copy-in. The data declaration optimization may be particularly useful in C/C++, where it is common practice to declare a data variable at the top of a function.

Pseudocode 7: data declaration optimization example.

```
Original Code:
double C[1000];
...
#pragma offload target(mic) in(B,C:length(1000))
{
    #pragma omp parallel for shared(B,C) private(i)
    for (i=0; i<1000; i++){
        C[i] = f(B[i]); //initialization of array C
    }
    ...
}
... /* no reads/writes to C */
Transformed Code:
...
#pragma offload target(mic) in(B:length(1000))
{
    double C[1000];
    #pragma omp parallel for shared(B,C) private(i)
    for (i=0; i<1000; i++){
        C[i] = f(B[i]);
    }
    ...
}
...
```

Optimization module 218 further includes conversion module 228 configured to perform malloc-to-memalign conversions. The use of DMA can significantly improve performance. In order for the (e.g., Intel™) compiler to generate DMA transfers, the pointer address should be 64-byte aligned and the data size should be a multiple of 64, which can be done using posix_memalign. Malloc-to-memalign optimization traces the malloc for a given data pointer in the in/inout clause and replaces it by a suitable posix_memalign when possible. A function, multiple64, is defined to round off the size of the allocated pointer to the next multiple of 64. Pseudocode 8 shows example code for malloc-to-memalign conversion.

Pseudocode 8: malloc-to-memalign conversion example.

```
Original Code:
double *data = (double*) malloc(dsize*sizeof(double))
...
#pragma offload target(mic) inout(data: length(dsize))
{
    ...
}
Transformed Code:
int multiple64(int n){
    int k = n/64;
    if(k*64 == n){
        return n;
    }
    return (k+1)*64;
}
posix_memalign((void **)&data, 4096, multiple64(dsize)
*sizeof(double))
...
#pragma offload target(mic) inout(data: length(multiple64(dsize)))
{
    ...
}
```

Optimization module 218 may include data reuse module 230 configured to perform data reuse optimization to eliminate redundant data transfers. When a data variable is copied into MIC, memory is allocated for it by default unless otherwise specified using the alloc_if clause. The alloc_if clause allows memory to be conditionally allocated based on the truth value of the predicate. Similarly, after a parallelizable code portion finishes to completion, the memory is deallocated by default, unless otherwise specified using the free_if clause, which allows memory to be conditionally deallocated.

If a data variable is shared between multiple parallelizable code portions or between successive executions of a code portion, it is generally beneficial to retain the data in MIC memory and consequently delete all redundant data transfers associated with it. This can be done with the help of alloc_if, free_if and nocopy clauses. A nocopy clause indicates that a variable's value already exists in MIC memory and prohibits copy-in.

As mentioned above, to apply data reuse optimization for a given variable, it is ensured that there are no definitions of the variable on the host side in between the two occurrences (i.e., uses or definitions) on the MIC side. This can be done by inspecting the use-def chain for the variable. The analysis needed for data reuse across two different executions within a parallelizable code portion (e.g., in a loop) is simpler than the analysis for data reuse across two different code portions. The complexity arises due to the conditional nature of offload—whether a code portion will execute on the host processor or be offloaded to MIC is dependent on the cost-benefit analysis and is not known at compile time. The data reuse optimization creates a dependency between two code portions. If only one of the portions is offloaded to MIC, incorrect results may be generated. In order to guarantee accuracy, either both or none of the code portions for which data reuse optimization is being applied should be offloaded to MIC.

For two different code portions, data reuse optimization may include performing if-fusion to combine the code portions, as illustrated in Pseudocode 9 below. Data reuse analysis may then be applied to the portions in the then branch by inspecting the use-def chains for all variables in the in/out/inout clauses. The variables that are defined on the host side in between the two code portions are not considered as candidates for reuse.

---
Pseudocode 9: if-fusion example.
---

Original Code:
if(cbf(arglist1)){
    #pragma offload target(mic) ..
    {
        code-section1
    }
}else{
    code-section1
}
...
if(cbf(arglist2)){
    #pragma offload target(mic) ..
    {
        code-section2
    }
}else{
    code-section2
}
Transformed Code:
int t1 = cbf(arglist1);
int t2 = cbf(arglist2);
if(t1 && t2)){
    #pragma offload target(mic) ..
    {
        code-section1
    }
    ...
    #pragma offload target(mic) ..
    {
        code-section2
    }
}else if(t1 && !t2){
    #pragma offload target(mic) ..
    {
        code-section1
    }

---
-continued

Pseudocode 9: if-fusion example.
---

...
    code-section2
}else if(!t1 && t2){
    code-section1
    ...
    #pragma offload target(mic) ..
    {
        code-section2
    }
}else{
    code-section1;
    ...
    code-section2;
}

If a data variable m occurs in the in/inout clause of the first pragma and the in clause of the second pragma, a free_if(0) is inserted in the first pragma and a nocopy along with alloc_if(0) is inserted in the second pragma. This informs the compiler that m is not to be deallocated after the completion of the first code portion and that it is not to be copied in or allocated for the second code portion. This transformation is illustratively depicted in Pseudocode 10 below.

---
Pseudocode 10: data reuse optimization transformation 1 example.
---

Original Code:
pragma offload target(mic) in(m:length(1000))
out(a:length(1000))
{
    #pragma omp parallel for shared(a,m) private(i)
    for(i=0; i < 1000; i++){
        a[i] = m[i];
    }
}
... /* no writes to m */
pragma offload target(mic) in(m:length(1000))
out(b:length(1000))
{
    #pragma omp parallel for shared(b,m) private(i)
    for(i=0; i < 1000; i++){
        b[i] = m[i]*m[i];
    }
}
Original Code:
pragma offload target(mic) in(m:length(1000) free_if(0))
out(a:length(1000))
{
    #pragma omp parallel for shared(a,m) private(i)
    for(i=0; i < 1000; i++){
        a[i] = m[i];
    }
}
... /* no writes to m */
pragma offload target(mic) nocopy(m:length(1000) alloc_if(0))
out(b:length(1000))
{
    #pragma omp parallel for shared(b,m) private(i)
    for(i=0; i < 1000; i++){
        b[i] = m[i]*m[i];
    }
}

If a data variable m occurs in the inout clause of both the pragmas, such that there are no uses of it in between on the host side, then m is moved from the inout to the in clause of the first pragma and from the inout to the out clause of the second pragma. A free_if(0) is inserted for it in the first pragma and a nocopy along with alloc_if(0) is inserted in the second pragma. This tells the compiler that m is to be reused between the first and second code portions and that it should be copied out only after the completion of the second code portion. Pseudocode 11 illustratively depicts this transformation.

---
Pseudocode 11: data reuse optimization transformation 2.
---

```
Original Code:
#pragma offload target(mic) in(k) inout(m:length(1000))
out(a:length(1000))
{
    #pragma omp parallel for shared(a,m) private(i)
    for(i=0; i < 1000; i++){
        m[i%100] = k*i;
        a[i] = m[i];
    }
}
... /* no reads or writes to m */
#pragma offload target(mic) inout(m:length(1000))
out(b:length(1000))
{
    #pragma omp parallel for shared(b,m) private(i)
    for(i=0; i < 1000; i++){
        b[i] = m[i]*m[i];
    }
}
Transformed Code:
#pragma offload target(mic) in(k) in(m:length(1000) free_if(0))
out(a:length(1000))
{
    #pragma omp parallel for shared(a,m) private(i)
    for(i=0; i < 1000; i++){
        m[i%100] = k*i;
        a[i] = m[i];
    }
}
... /* no reads or writes to m */
#pragma offload target(mic) nocopy(m:length(1000) alloc_if(0))
out(b,m:length(1000))
{
    #pragma omp parallel for shared(b,m) private(i)
    for(i=0; i < 1000; i++){
        b[i] = m[i]*m[i];
    }
}
```

To apply data reuse analysis across different executions of an parallelizable code portion within a loop, the use-def chains for all variables in the in/out/inout clause are inspected. If a data variable in the in/inout clause is not defined outside the code portion within the surrounding loop, data reuse optimization is applied to the code portion. An empty code portion (surrounded by a pragma offload) is created and placed right before the original code portion. The empty code portion is only executed for the first iteration of the loop. All data variables in the in clause that are not defined outside the code portion in the surrounding loop are moved to the in clause of the empty code portion. Corresponding nocopy, free_if(0), and alloc_if(0) clauses are inserted as illustrated in Pseudocode 12 below. All data variables in the inout clause that are not defined outside the code portion in the surrounding loop (but may get used) are moved to the in clause of the empty code portion and to the out clauses of the original code portion.

If any of those data variables are neither defined nor used outside the code portion in the surrounding loop, another empty code portion is created and placed right after the loop, and all such variables are moved from the out clause of the original code portion to the out clause of this empty code portion. Corresponding nocopy, free_if(0), and alloc_if(0) clauses are inserted. Since the two empty code portions are only executed once, the copy-in/copy-out and memory allocation of the data variables is done once per loop as opposed to once per iteration.

---
Pseudocode 12: data reuse optimization transformation 3.
---

```
Original Code:
for(i=0; i < N; i++){
    ...
    #pragma offload target(mic) inout(m:length(1000))
    {
        #pragma omp parallel for ..
        for(i=0; i < 1000; i++){
            a[i] = m[i];
            ...
            m[i] = a[i] * m[i];
            ...
        }
    }
    ...
}
Transformed Code:
int first_p = 1;
for(i=0; i < N; i++){
    ...
    if(first_p){
        #pragma offload target(mic) inout(first_p) in(m:length(1000) free_if(0))
        {
            first_p = 0;
        }
    }
    #pragma offload target(mic) nocopy(m:length(1000) alloc_if(0) free_if(0))
    {
        #pragma omp parallel for ..
        for(i=0; i < 1000; i++){
            a[i] = m[i];
            ...
            m[i] = a[i] * m[i];
            ...
        }
    }
    ...
}
#pragma offload target(mic) out(m:length(1000)) alloc_if(0)
{
}
```

Memory 206 may also include cost module 220 configured to perform a cost-benefit analysis. All of the parallelizable code portions are inspected and the parameter list for the cost-benefit analysis function (cbf( )) is populated for each code portion.

The idea behind the cost-benefit analysis is to determine estimates representing the amount of work done and data communicated per code portion, and pass the results as parameters to the cost model. A code portion is typically a parallelizable loop and, in some cases (e.g., where offload hoisting has been successfully applied), a set of parallelizable loops with limited serial code in between.

To estimate the amount of work done in the code portion, the following are identified: (i) the set of CPU operations (e.g., addition, subtraction, multiplication, exponentiation, etc.) in the code portion condensed into a single number (e.g., cpu_ops) per loop based on relative weights (that are experimentally obtained) for the different operations; (ii) the set of memory operations (e.g., loads/stores) condensed into a single number (e.g., mem_ops) per loop; and (iii) the number of loop iterations (e.g., num_iter) for each loop. The estimate for data transfer size (e.g., dsize) may be obtained by addition up the data sizes of all the scalars, arrays, and pointers specified in the in/out/inout clauses. This information is passed as a set of parameters to the cost-benefit analysis function cbf( ) for each code portion.

A cost model is invoked by cbf( ) at runtime to ascertain whether a code portion should be offloaded to MIC. The cost model may include a set of heuristic checks to determine profitability. An exemplary cost model is illustrated in Pseudocode 13 below. Preferably, four checks should be satisfied for a code portion to be profitably offloaded to MIC. It is noted that the cost model is not limited to satisfying all of the following four checks, but may also include one or more of the following checks. Other checks have also been contemplated.

First, the number of iterations of every loop in the code portion should be greater than a certain threshold k1. Second, the total amount of work done in the code portion over all loops, i.e., $\Sigma_i((cpu\_ops_i + mem\_ops_i) * num\_iter_i)$, should be greater than a threshold k2. Third, the ratio of total CPU operations to total data transfer size, i.e., $\Sigma_i(cpu\_ops_i * num\_iter_i)/dsize$, should be greater than a threshold k3. And fourth, the ratio of total CPU operations to total memory operations, i.e., $\Sigma_i(cpu\_ops_i * num\_iter_i)/\Sigma_i(mem\_ops_i * num\_iter_i)$, should be greater than a threshold k4. The fourth check reflects the experimental performance suggesting that memory intensive code portions do not perform well on the current MIC hardware. The values of k1 through k2 are preferably experimentally obtained.

---

Pseudocode 13: cost model example.

Input: For all loops in code section: number of loop iterations {num_iter$_1$, .., num_iter$_n$}, number of cpu operations {cpu_ops$_1$, ..., cpu_ops$_n$}, number of memory operations {mem_ops$_1$, ..., mem_ops$_n$}; data transfer size dsize; thresholds: k1, k2, k3, k4
Output: TRUE or FALSE
Procedure cbf( )
    for i = 1 → n do
        if (num_iter$_i$ ≤ k1) then
            return FALSE;
        end if
    end for
    total_work ← $\Sigma_i((cpu\_ops_i + mem\_ops_i) * num\_iter_i)$
    if (total_work ≤ k2) then
        return FALSE;
    end if
    total cpu_ops ← $\Sigma_i(cpu\_ops_i * num\_iter_i)$
    if ((total_cpuops/dsize) ≤ k3) then
        return FALSE;
    end if
    total mem_ops ← $\Sigma_i(mem\_ops_i * num\_iter_i)$
    if ((total_cpuops/total_memops) ≤ k4) then
        return FALSE;
    end if
    return TRUE;

---

Memory 206 may also include identification module 222 configured to identify parallelizable loops for an input application where the developer has not done so. Preferably, parallelizable loops are identified using the auto-parallelizer of the compiler (e.g., Intel™ Compiler (ICC)). When the developer passes the -parallel -mic flag, ICC is invoked with -c -parallel -par-report1. This invokes the compiler's auto-parallelizer and dumps the parallelization report to stderr. The par-report is analyzed to identify loops that have been parallelized by ICC. A #pragma omp parallel for is inserted for each of those loops in the source code. The output is an OpenMP application, which can then be normally compiled using the -gencodeMIC flag. Other implementations of identifying parallelizable loops are also contemplated.

The output 232 of compiling system 202 is an application that runs on a many-core coprocessor and/or a multi-core processor. Preferably, the application is optimized for performance.

Figure 3:
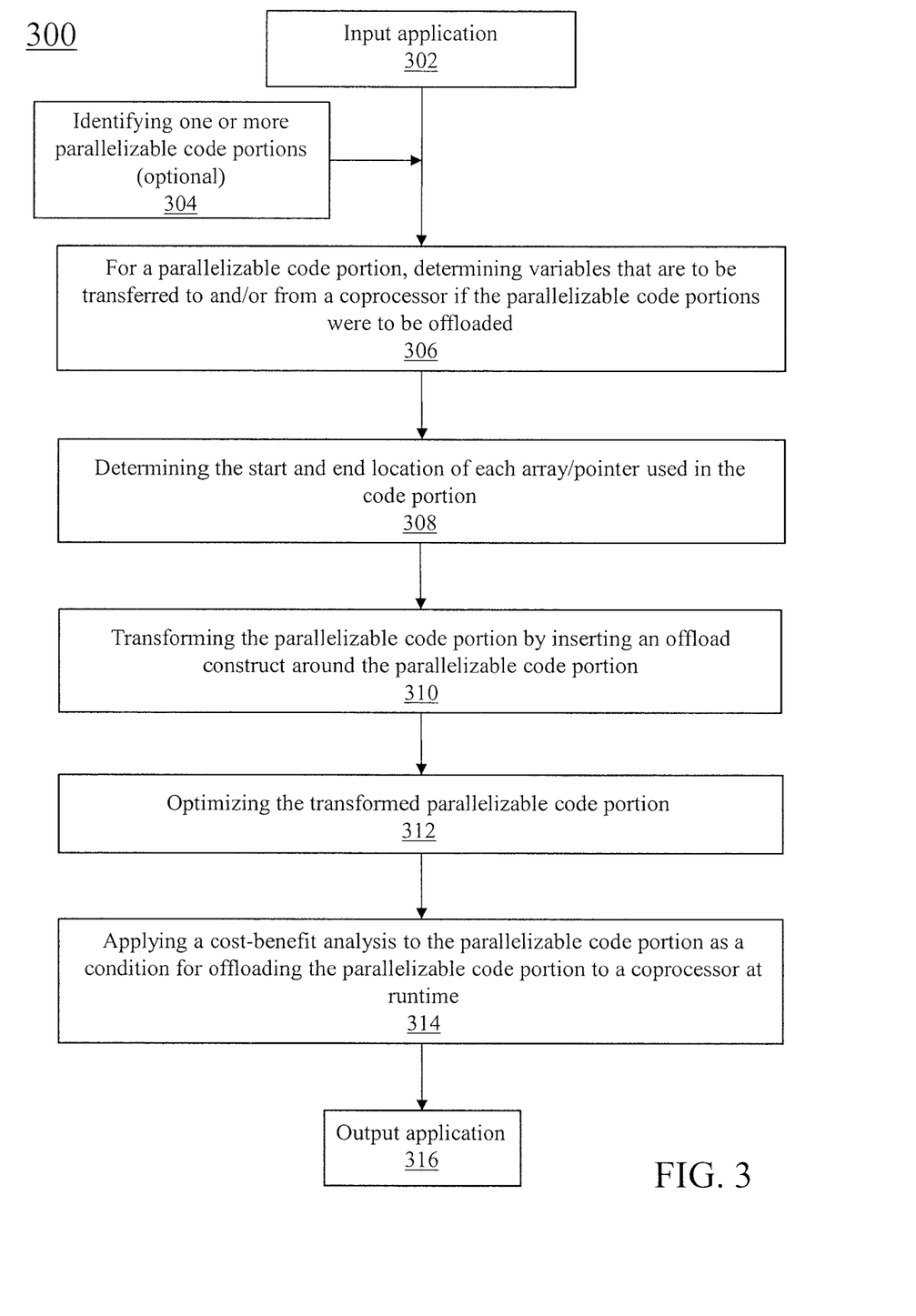
FIG. 3 is a block/flow diagram showing a method for compiling in accordance with one embodiment.

Referring now to FIG. 3, a method for compiling 300 is illustratively depicted in accordance with one embodiment. In block 302, an application is input. In a preferred embodiment, the application is written in one or more of C, C++, and Fortran with parallelizable loops annotated with OpenMP or CilkPlus constructs. Other programming languages and programming models are also contemplated. In another embodiment, the application may include vanilla application where parallelizable loops have not been annotated. In still another embodiment, the application may include an unoptimized MIC application. Other inputs are also contemplated.

In block 304, if the input application is a vanilla application, auto-parallelization is performed to identify parallelizable code portions. In one embodiment, auto-parallelization includes invoking the (e.g., Intel™) compiler's auto-parallelizer to identify parallelizable code portions. Each identified code portion is annotated with a construct such as, e.g., #pragma omp parallel. Other methods of identifying parallelizable code portions are also contemplated.

In block 306, for each parallelizable code portion, liveness analysis is performed. Liveness analysis includes determining variables that are to be copied in to a coprocessor (i.e., live-in variables) and variables that are to be copied out of a coprocessor (i.e., live-out variables) if the parallelizable code portion were to be offloaded. Liveness analysis is applied to simple arrays and pointers, as well as scalars. Preferably, prior to performing liveness analysis, all function invocations within the code portion are eliminated by, e.g., inlining the function bodies.

LIVE_IN and LIVE_OUT sets are constructed for scalars, array, and pointers within the parallelizable code portion. Variables common to both the IN and OUT sets populate the inout clause, representing the set of variables that should be copied into MIC prior to execution of the code portion and copied out of MIC after completion. Variables present only in the IN set populate the in clause, representing the set of variables that should be copied into MIC. Scalars present only in the OUT set populate the out clause, representing the set of variables that should be copied out of MIC after the code portion executes to completion. However, when an array/pointer is copied back to host memory, any unassigned memory locations (on the MIC side) will cause null/garbage to be written onto corresponding memory locations on the host side. To prevent this from happening, pointers and arrays only present in the OUT set populate the inout clause, instead of the out clause.

In block 308, an array bound analysis is performed on the parallelizable code portion to determine the start and end location of each non-scalar variable (i.e., arrays and pointers) used in the parallelizable code portion. In a preferred embodiment, array bound analysis includes identifying a memory access pattern of an array/pointer by parsing it as a function of the loop indices. For each loop index, the corresponding stride, lower bound and upper bound are extracted to estimate the bounds of the array/pointer. Other methods of array bound analysis are also contemplated. For example, array bound analysis may include tracing the declaration of the array/pointer and passing the size of the array/pointer to the length clause.

In block 310, conditional offload insertion is applied to transform the parallelizable code portion such that the parallelizable code portion may be offloaded to a coprocessor upon execution. Conditional offload insertion includes creating an if-then-else block, with the original parallelizable code portion being placed in the else branch and a copy of the parallelizable code portion being placed in the then branch. A cost-benefit analysis function is applied as the predicate of the if statement. An offload construct, #pragma offload, is inserted at the beginning of the then branch with empty in/out/inout and length clauses, such that parallelizable code portions are offloaded to the coprocessor where the cost-benefit analysis determines that it would be beneficial. The in/out/inout and length clauses are then populated based on the results of the liveness analysis from block 306 and array bound analysis from block 308.

In one embodiment, conditional offload insertion is only applied to parallelizable code portion candidates that take up less than t % (e.g., t<10) of the total time of execution of the application. Other criteria are also contemplated.

If the input application is a MIC application, in another embodiment, transformation is similar to conditional offload insertion. However, the #pragma conditional-offload construct is replaced with a #pragma offload construct in the then branch and deleted from the else branch.

In block 312, the transformed parallelizable code portion is optimized. Optimizations may be performed as discussed with respect to FIGS. 4 through 7. Traditional compiler optimizations (e.g., vectorization) may also be performed by the compiler. Other optimizations are also contemplated.

Figure 4:
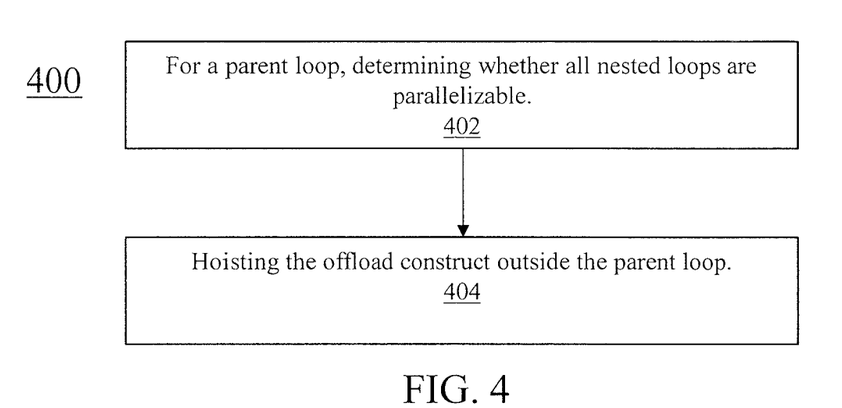
FIG. 4 is a block/flow diagram showing a system/method for offload hoisting in accordance with one embodiment.

Referring for a moment for FIG. 4, a method for offload hoisting 400 to optimize parallelizable code portions is illustratively depicted in accordance with one embodiment. In block 402, for a parent loop, it is determined whether all nested loops are parallelizable. If so, in block 404, the offload construct, #pragma offload, is hoisted outside of the parent loop. The variables to be copied in and out of the offload construct for the parent loop is constructed by combining the live-in and live-out variables of the offload constructs for the inner loops. Preferably, serial code between inner loops is minimal.

Figure 5:
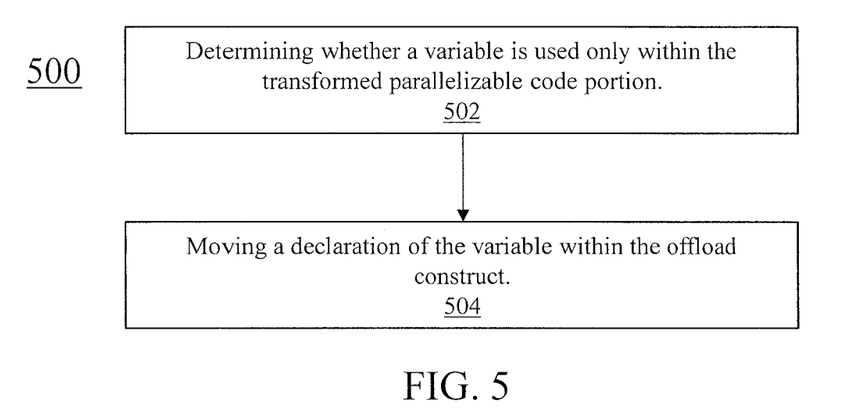
FIG. 5 is a block/flow diagram showing a system/method for data declaration optimization in accordance with one embodiment.

Referring for a moment for FIG. 5, a method for data declaration optimization 500 to optimize parallelizable code portions is illustratively depicted in accordance with one embodiment. In block 502, it is determined whether a variable is used only within a parallelizable code portion. This may include checking the set of variables copied out of an offload construct for of the loop. If the variable is local to the function, in block 504, the declaration of the variable is moved within the offload construct. Advantageously, this avoids the redundant copy-in of such variables.

Figure 6:
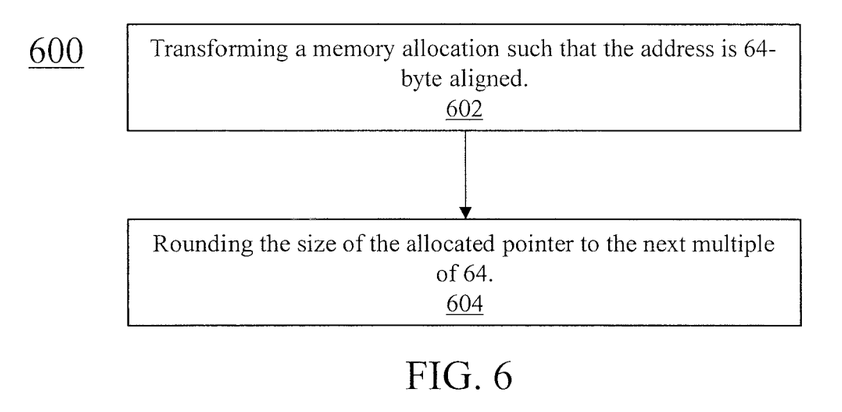
FIG. 6 is a block/flow diagram showing a system/method for malloc-to-memalign conversion in accordance with one embodiment.

Referring for a moment to FIG. 6, a method for malloc-to-memalign conversion to generate DMA transfers 600 is illustratively depicted in accordance with one embodiment. In block 602, a memory allocation is transformed such that the address is 64-byte aligned. Preferably, the malloc for a given data pointer for a variable copied in is replaced with the function posix_memalign when possible. In block 604, the size of the allocated pointer is rounded to the next multiple of 64 by, e.g., applying the function multiple64 illustrated in Pseudocode 8.

Figure 7:
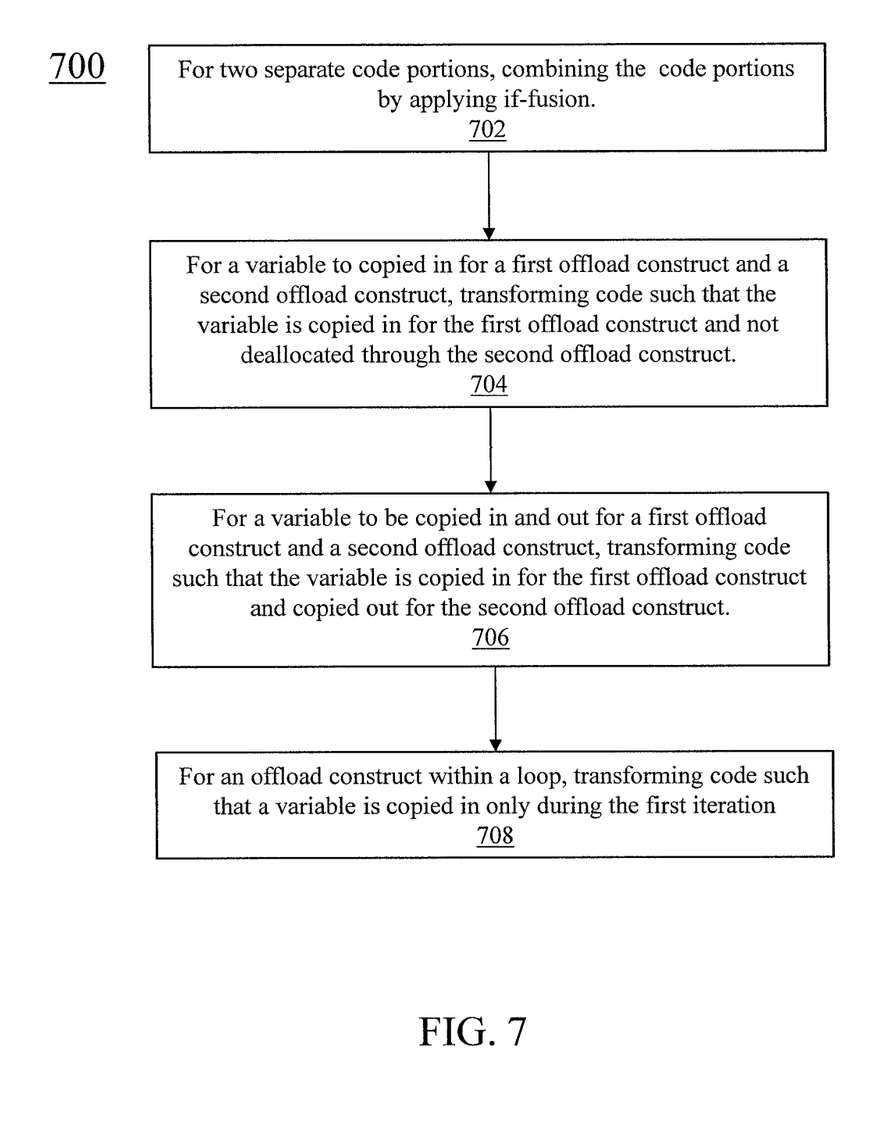
FIG. 7 is a block/flow diagram showing a system/method for data reuse optimization in accordance with one embodiment.

Referring for a moment to FIG. 7, a method for data reuse 700 to eliminate redundant data transfers between code portions is illustratively depicted in accordance with one embodiment. Generally, data reuse optimization analysis for data across two different executions of a parallelizable code portion is simpler than the analysis for data reuse across two different code portions. As such, for data reuse optimization across two different code portions, in block 702, if-fusion is performed to combine the if blocks of two or more code portions into one.

To apply data reuse optimization for a given variable, there must not be definitions of that variable on the host side. Data reuse optimization continues in the then branch by inspecting the use-def chains for all variables in the in/out/inout clauses. Variables that are defined on the host side between code portions are not candidates for reuse.

In block 704, for a variable to be copied in for a first offload construct (i.e., the in or inout clause) and a second offload construct (i.e., the in clause), code is transformed such that the variable is copied in for the first offload construct and is not deallocated through the second offload construct.

In block 706, for a variable to be copied in and out for both a first offload construct and for a second offload construct, code is transformed such that the variable is copied in for the first offload construct and copied out for the second offload construct. This may involve moving the variable from the inout clause of the first and second offload constructs to the in clause of the first offload construct and the out clause of the second offload construct.

To apply data reuse optimization for an offload construct within a loop, in block 708, code is transformed such that a variable is copied in only during the first iteration. The use-def chains for all variables may be first inspected to ensure that the variables are not defined outside the parallelizable code portion. The original code portion is transformed such that the copy-in, copy-out and memory allocation is performed once per loop, as opposed to once per iteration. In one embodiment, an empty offload construct code portion is created right before the original code portion. The empty offload construct code portion is only executed the first iteration to copy-in variables in the in or inout clause of the original code portion. In another embodiment, a second empty offload construct code portion may also be created after the original code portion (after the loop) to copy-out variables in the inout or out clause of the original code portion. The original code portion is also transformed to include conditional allocation (i.e., alloc_if(0)), conditional deallocation (i.e., free_if(0)), and a nocopy clause indicating that the variable already exists in MIC.

Referring back to FIG. 3, in block 314, a cost-benefit analysis is applied to the parallelizable code portion at runtime to determine whether it would be profitable to offload the parallelizable code portion to a coprocessor. The parallelizable code portion is first inspected to identify: (i) the set of CPU operations represented as a single number per loop based upon relative weights for each operation; (ii) the set of memory options represented as a single number per loop; and (iii) the number of loop iterations for each loop. An estimate of data transfer size is also determined by adding up the size of all scalars, arrays and pointers specified in the in/out/inout clauses. This information is passed as a set of parameters to the cost-benefit analysis function.

The cost-benefit analysis applies a cost model based on one or more of the following heuristic checks: (i) the number of iterations of every loop should be greater than a threshold k1; (ii) the total amount of work over all loops should be greater than a threshold k2; (iii) the ratio of total CPU operations to total data transfer size should be greater than a threshold k3; and (iv) the ratio of total CPU operations to total memory operations should be greater than a threshold k4. Other heuristic checks are also contemplated. The values of k1 through k4 may be predetermined based on, e.g., experimentation.

In block 316, an application is output that runs on many-core coprocessors and/or multi-core processors. Preferably, the application is optimized for performance.

Having described preferred embodiments of a compiler for x86-based many-core processors (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for compiling, comprising:

receiving an annotated application having parallelizable code portions for a many-core coprocessor;

for a parallelizable code portion of the annotated application stored on a computer readable storage medium, determining one or more variables that are to be transferred to and/or from a coprocessor if the parallelizable code portion were to be offloaded with a liveness analysis to determine variables to be copied in to (live-in variables) and out of (live-out variables) the many-core coprocessor;

determining a start location and an end location for at least one of the one or more variables as a size in memory; and transforming the parallelizable code portion by inserting an offload construct around the parallelizable code portion and passing the one or more variables and the size as arguments of the offload construct such that the parallelizable code portion is offloaded to said coprocessor at runtime, wherein the parallelizable code portion is guarded by an if condition that invokes a cost-benefit analysis at the runtime to determine whether offloading a particular code section to the many-core coprocessor is beneficial;

optimizing the transformed parallelizable code portion by performing optimizing operations unrelated to the determination of the cost-benefit analysis;

invoking the cost-benefit analysis to the parallelizable code portion at the runtime as a condition for making a determination to offload the parallelizable code portion to the coprocessor is beneficial, wherein the cost benefit analysis is based on a number of iterations for every loop compared to a first threshold, a total amount of work over all loops compared to a second threshold, a ratio of total central processing unit (CPU) operations to total data transfer size as compared to a third threshold, and a ratio of total CPU operations to total memory operations compared to a fourth threshold; and offloading the parallelizable code portion to the many-core coprocessor if necessary.

2. The method as recited in claim 1, wherein the one or more variables include at least one of a live-in variable that is to be copied into said coprocessor and a live-out variable that is to be copied out of the coprocessor if the parallelizable code portion were to be offloaded.

3. The method as recited in claim 1, wherein transforming includes conditioning offload of the parallelizable code portion.

4. The method as recited in claim 3, wherein conditioning includes applying an original parallelizable code portion where a condition fails.

5. The method as recited in claim 1, wherein the cost-benefit analysis is based on one or more of: central processing unit operations per loop based on weights for different operations, memory operations per loop, number of iterations for each loop, and data transfer size.

6. The method as recited in claim 1, wherein the coprocessor is part of the many-core processor.

7. A system comprising:

a processor in a computer; and a non-transitory computer readable program, wherein the computer readable program when executed on the computer causes the computer to execute code performing:

receiving an annotated application having parallelizable code portions for a many-core coprocessor;

for a parallelizable code portion of the annotated application stored on a computer readable storage medium, determining one or more variables that are to be transferred to and/or from a coprocessor if the parallelizable code portion were to be offloaded with a liveness analysis to determine variables to be copied in to (live-in variables) and out of (live-out variables) the many-core coprocessor;

determining a start location and an end location for at least one of the one or more variables as a size in memory; and transforming the parallelizable code portion by inserting an offload construct around the parallelizable code portion and passing the one or more variables and the size as arguments of the offload construct such that the parallelizable code portion is offloaded to said coprocessor at runtime, wherein the parallelizable code portion is guarded by an if condition that invokes a cost-benefit analysis at the runtime to determine whether offloading a particular code section to the many-core coprocessor is beneficial;

optimizing the transformed parallelizable code portion by performing optimizing operations unrelated to the determination of the cost-benefit analysis;

invoking the cost-benefit analysis to the parallelizable code portion at the runtime as a condition for making a determination to offload the parallelizable code portion to the coprocessor is beneficial, wherein the cost benefit analysis is based on a number of iterations for every loop compared to a first threshold, a total amount of work over all loops compared to a second threshold, a ratio of total central processing unit (CPU) operations to total data transfer size as compared to a third threshold, and a ratio of total CPU operations to total memory operations compared to a fourth threshold; and offloading the parallelizable code portion to the many-core coprocessor if necessary.

8. A method for compiling, comprising:

receiving an annotated application having parallelizable code portions for a many-core coprocessor;

for a parallelizable code portion of the annotated application stored on a computer readable storage medium, determining one or more variables that are to be transferred to and/or from a coprocessor if the parallelizable code portion were to be offloaded with a liveness analysis to determine variables to be copied in to (live-in variables) and out of (live-out variables) the many-core coprocessor;

determining a start location and an end location for at least one of the one or more variables as a size in memory; and transforming the parallelizable code portion by inserting an offload construct around the parallelizable code portion and passing the one or more variables and the size as arguments of the offload construct, wherein the parallelizable code portion is offloaded to said coprocessor at runtime based on a cost-benefit such that an original parallelizable code portion, wherein the parallelizable code portion is guarded by an if condition that invokes the cost-benefit analysis at the runtime to determine whether offloading the original parallelizable code portion to the many-core coprocessor is beneficial;

optimizing the transformed parallelizable code portion by performing optimizing operations unrelated to the determination of the cost-benefit analysis;

invoking the cost-benefit analysis to the parallelizable code portion at the runtime as a condition for making a determination to offload the parallelizable code portion to the coprocessor is beneficial, wherein the cost benefit analysis is based on a number of iterations for every loop compared to a first threshold, a total amount of work over all loops compared to a second threshold, a ratio of total central processing unit (CPU) operations to total data transfer size as compared to a third threshold, and a ratio of total CPU operations to total memory operations compared to a fourth threshold; and offloading the parallelizable code portion to the many-core coprocessor if necessary.

9. The method as recited in claim 8, wherein the cost-benefit analysis is based on one or more of: central processing unit operations per loop based on weights for different operations, memory operations per loop, number of iterations for each loop, and data transfer size.

10. A system for compiling, comprising:
a memory comprises:
  a data analysis module receiving an annotated application having parallelizable code portions for a many-core coprocessor and determining one or more variables that are to be transferred to and/or from a coprocessor for a parallelizable code portion of the annotated application stored on a computer readable storage medium, if the parallelizable code portion were to be offloaded with a liveness analysis to determine variables to be copied in to (live-in variables) and out of (live-out variables) the many-core coprocessor;
  the data analysis module further determining a start location and an end location for at least one of the one or more variables as a size in memory;
  a transformation module transforming the parallelizable code portion by inserting an offload construct around the parallelizable code portion and passing the one or more variables and the size as arguments of the offload construct such that the parallelizable code portion is offloaded to said coprocessor at runtime, wherein the parallelizable code portion is guarded by an if condition that invokes a cost-benefit analysis at the runtime to determine whether offloading a particular code section to the many-core coprocessor is beneficial;
  optimizing the transformed parallelizable code portion by performing optimizing operations unrelated to the determination of the cost-benefit analysis;
  invoking the cost-benefit analysis to the parallelizable code portion at the runtime as a condition for making a determination to offload the parallelizable code portion to the coprocessor is beneficial, wherein the cost benefit analysis is based on a number of iterations for every loop compared to a first threshold, a total amount of work over all loops compared to a second threshold, a ratio of total central processing unit (CPU) operations to total data transfer size as compared to a third threshold, and a ratio of total CPU operations to total memory operations compared to a fourth threshold; and
  offloading the parallelizable code portion to the many-core coprocessor if necessary.

11. The system as recited in claim 10, wherein the one or more variables include at least one of a live-in variable that is to be copied into said coprocessor and a live-out variable that is to be copied out of the coprocessor if the parallelizable code portion were to be offloaded.

12. The system as recited in claim 10, wherein the transformation module is further configured to condition offload of the parallelizable code portion.

13. The system as recited in claim 10, wherein the cost-benefit analysis is based on one or more of: central processing unit operations per loop based on weights for different operations, memory operations per loop, number of iterations for each loop, and data transfer size.

14. The system as recited in claim 10, further comprising an identification module configured to identify and annotate one or more parallelizable code portions.

15. The system as recited in claim 10, wherein the coprocessor is part of a many-core coprocessor.

* * * * *